United States Patent
Kira et al.

(10) Patent No.: US 9,188,805 B2
(45) Date of Patent: Nov. 17, 2015

(54) LIQUID CRYSTAL DISPLAY AND PRODUCTION METHOD THEREOF

(71) Applicant: MITSUBISHI ELECTRIC CORPORATION, Tokyo (JP)

(72) Inventors: Syuuichi Kira, Tokyo (JP); Akio Nakayama, Tokyo (JP); Kazushi Yamayoshi, Kumamoto (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 156 days.

(21) Appl. No.: 13/912,066

(22) Filed: Jun. 6, 2013

(65) Prior Publication Data

US 2013/0335657 A1    Dec. 19, 2013

(30) Foreign Application Priority Data

Jun. 19, 2012 (JP) ................... 2012-137758

(51) Int. Cl.
*G02F 1/1335* (2006.01)
*G02F 1/1333* (2006.01)
*G02B 27/22* (2006.01)
*H04N 13/04* (2006.01)

(52) U.S. Cl.
CPC .......... *G02F 1/1335* (2013.01); *G02B 27/2214* (2013.01); *G02F 1/1333* (2013.01); *G02F 1/133512* (2013.01); *H04N 13/0409* (2013.01)

(58) Field of Classification Search
CPC ...................................... G02F 1/1335
USPC ........................ 349/15, 41; 445/24
See application file for complete search history.

(56) References Cited

U.S. PATENT DOCUMENTS

| 7,420,637 | B2 | 9/2008 | Imai et al. | |
| 2005/0243253 | A1* | 11/2005 | Imai et al. | 349/122 |
| 2008/0231186 | A1* | 9/2008 | Kim et al. | 313/582 |
| 2009/0086150 | A1* | 4/2009 | Koyama et al. | 349/153 |
| 2009/0147178 | A1* | 6/2009 | Ahn et al. | 349/62 |
| 2009/0257003 | A1* | 10/2009 | Yoshihara et al. | 349/96 |
| 2011/0149218 | A1* | 6/2011 | Nakayama | 349/106 |
| 2011/0199549 | A1* | 8/2011 | Washizawa | 349/15 |
| 2011/0293928 | A1* | 12/2011 | Chu et al. | 428/336 |
| 2012/0105954 | A1* | 5/2012 | Prouty, IV | 359/462 |
| 2012/0262637 | A1* | 10/2012 | Ikeda et al. | 349/15 |
| 2012/0320170 | A1* | 12/2012 | Lee et al. | 348/54 |

FOREIGN PATENT DOCUMENTS

| JP | 09-166777 A | 6/1997 |
| JP | 2007-072476 A | 3/2007 |
| JP | 2011-128547 A | 6/2011 |

* cited by examiner

*Primary Examiner* — Sang V Nguyen
(74) *Attorney, Agent, or Firm* — Studebaker & Brackett PC

(57) ABSTRACT

A liquid crystal display includes: first and second transparent substrates located such that inner main surfaces face each other with a gap being provided therebetween and a liquid crystal layer is held between the substrates; a parallax barrier provided on an outer main surface of the first transparent substrate and optically separating pixels displaying an image into pixels visually recognized in a specific direction and pixels visually recognized in another specific direction; and a plurality of switching elements, arrayed on the inner main surface of the second transparent substrate, for applying voltage to drive the liquid crystal; wherein the parallax barrier includes a plurality of transmissive portions arrayed to transmit light and a plurality of light blocking portions provided respectively around the transmissive portions to block light, and each of the light blocking portions includes two or more layered light blocking films.

13 Claims, 8 Drawing Sheets

F I G . 1
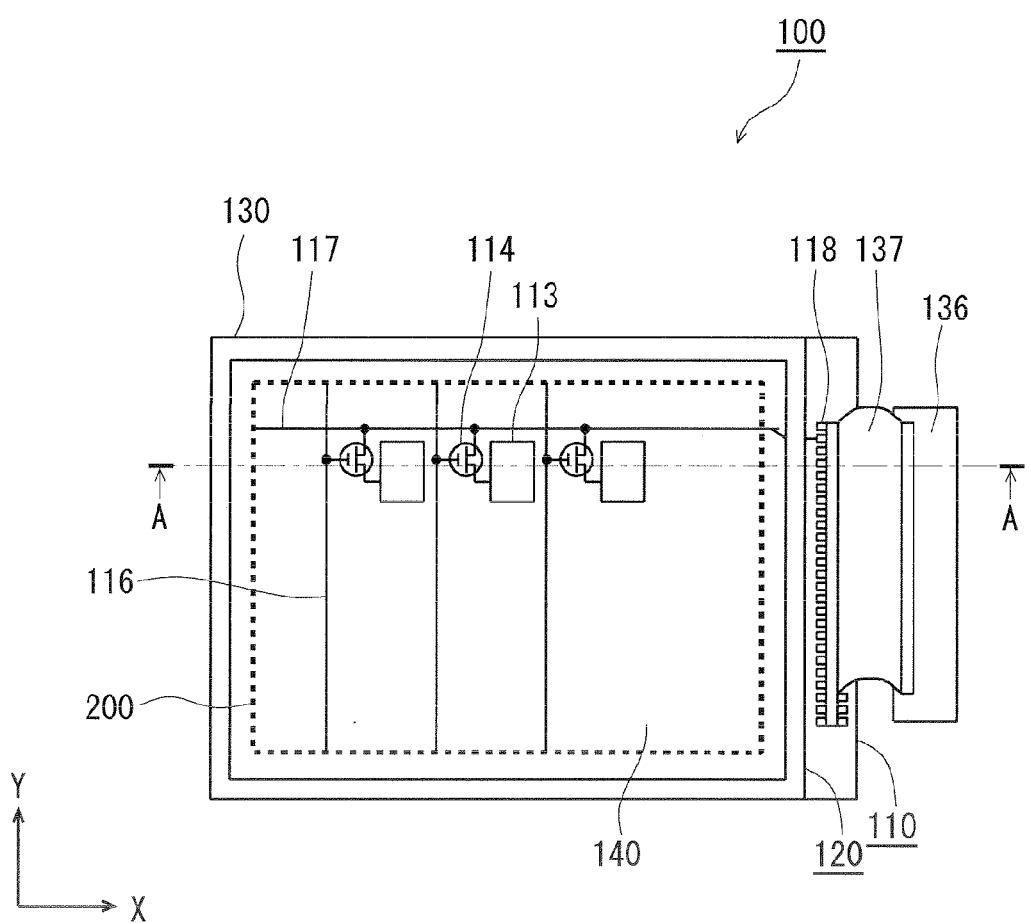

LIQUID CRYSTAL DISPLAY AND PRODUCTION METHOD THEREOF

BACKGROUND OF THE INVENTION

1. Field of the Invention

The present invention relates to a liquid crystal display, and particularly relates to a liquid crystal display of a parallax barrier system.

2. Description of the Background Art

There has been proposed a liquid crystal display (dual-screen LCD) capable of displaying dual images on a display screen so that one of the images is visually recognized in a left direction and another one of the images is visually recognized in a right direction.

Such a dual-screen LCD is applied to a display for providing different images to viewers at right and left positions, such as a driver and a passenger in a vehicle, or a three-dimensional (3D) display for providing different images to right and left eyes of a viewer so as to form a three-dimensional image.

Such a dual-screen LCD is realized by optically separating pixels providing an image into pixels visually recognized in a specific direction and pixels visually recognized in another specific direction. It is also possible to display multiple images by modifying separating means so that pixels are visually recognized in multiple directions without limiting the directions of visually recognizing the pixels (lines of sight) to the two right and left directions.

While there is proposed a technique with use of a lens or the like as the means for optically separating lines of sight, a parallax barrier technique has been getting popular, in which lines of sight of visually recognizing pixels are separated by a light blocking film (parallax barrier) provided with an opening (transmissive portion) in correspondence with each of pixels providing different images.

For example, Japanese Patent Application Laid-Open No. 2007-072476 discloses a mechanism in which light having transmitted a color filter (CF)-black matrix (BM) surface is blocked by a parallax barrier to travel only in a specific line of sight, so as to provide an image visually recognized in a left direction and another image visually recognized in a right direction on a display screen of a liquid crystal display.

Such a parallax barrier has been conventionally formed by preparing a glass substrate provided with a parallax barrier separately from a liquid crystal cell and attaching the glass substrate onto an outer surface of the liquid crystal cell. On the other hand, Japanese Patent Application Laid-Open No. 2007-072476 proposes a method of forming a parallax barrier directly on a CF glass surface.

According to Japanese Patent Application Laid-Open No. 2007-072476, the liquid crystal cell is formed after having formed both a light blocking film serving as the black matrices and a light blocking film serving as the parallax barrier respectively on front and rear surfaces of a CF substrate. To the contrary, Japanese Patent Application Laid-Open No. 2011-128547 discloses a method of initially forming a liquid crystal cell, secondly thinning a CF substrate, and then forming a parallax barrier.

Japanese Patent Application Laid-Open No. 09-166777 (1997) discloses employing double-layered light blocking films serving as a black mask (black matrices) formed on a CF glass surface, in order to suppress generation of pinholes due to adhesion of dust or the like. In this method, the lower light blocking film is formed and cleaned to remove dust and the like before the upper light blocking film is formed.

As disclosed in Japanese Patent Application Laid-Open No. 2007-072476 and Japanese Patent Application Laid-Open No. 2011-128547, in the configuration in which the parallax barrier is formed directly on the CF glass surface, the light blocking film serving as the parallax barrier is provided on the rear surface of the CF substrate (that is, a front surface of a display).

However, in the conventional method of forming a light blocking film, the obtained light blocking film is possibly provided with pinholes or defective patterns due to foreign substances having been left on the glass substrate prior to the formation of the light blocking film or foreign substances adhering to the glass substrate during the formation.

Such pinholes and defective patterns may cause bright spots or variation in brightness, which lead to deterioration in display quality. Additionally, the light blocking film exposed on the outermost surface is likely to be provided with cracks and the like after the formation of the light blocking film. The light blocking film having such cracks deteriorates in its functions, which also leads to deterioration in display quality.

Such pinholes and defective patterns due to foreign substances are problematically recognized also in Japanese Patent Application Laid-Open No. 09-166777 (1997). However, Japanese Patent Application Laid-Open No. 09-166777 (1997) discloses the invention relating to light blocking films in a CF substrate, serving as the black mask provided inside a cell of a liquid crystal panel, and does not relate to a light blocking film formed on the rear surface of a CF substrate. According to Patent Application Laid-Open No. 09-166777 (1997), the black mask is located inside the cell after the cell of the liquid crystal panel is formed. Patent Application Laid-Open No. 09-166777 (1997) does not have the problem caused by the light blocking film exposed outside the cell as in Japanese Patent Application Laid-Open No. 2007-072476 and Japanese Patent Application Laid-Open No. 2011-128547. Patent Application Laid-Open No. 09-166777 (1997) neither discloses nor suggests such a configuration for solving the problem of cracks formed in a light blocking film (parallax barrier) provided outside a cell of a liquid crystal panel.

SUMMARY OF THE INVENTION

It is an object of the present invention to provide a liquid crystal display that is capable of keeping excellent display quality even when a pinhole, a defective pattern, a crack, or the like is formed in a light blocking film serving as a parallax barrier.

According to an aspect of the present invention, there is provided a liquid crystal display including: first and second transparent substrates located such that inner main surfaces face each other with a gap being provided therebetween and a liquid crystal layer is held between the substrates; a parallax barrier provided on an outer main surface of the first transparent substrate and optically separating pixels displaying an image into pixels visually recognized in a specific direction and pixels visually recognized in another specific direction; and a plurality of switching elements, arrayed on an inner main surface of the second transparent substrate, for applying voltage to drive the liquid crystal; wherein the parallax barrier includes a plurality of transmissive portions arrayed to transmit light and a plurality of light blocking portions provided respectively around the transmissive portions to block light, and each of the light blocking portions includes two or more layered light blocking films.

In this liquid crystal display, the light blocking portions in the parallax barrier each include the two or more layered light blocking films. Even when a crack or the like is formed in the upper light blocking film, the lower light blocking film prevents light transmission so as to prevent deterioration in display quality. The liquid crystal display is thus capable of keeping excellent display quality.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a plan view of a liquid crystal panel of a liquid crystal display according to the present invention;

DESCRIPTION OF THE PREFERRED EMBODIMENTS

First Preferred Embodiment

<Entire Configuration of Liquid Crystal Panel>

Figure 2:
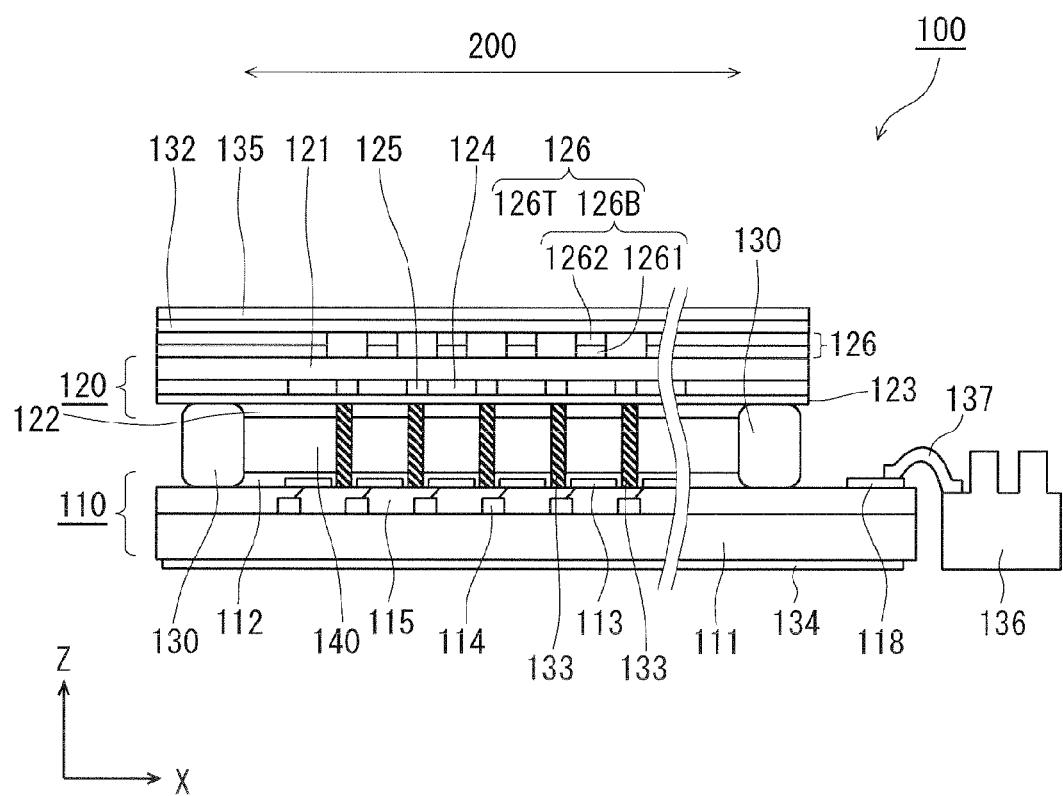
FIG. 2 is a sectional view of the liquid crystal panel of the liquid crystal display according to the present invention.

Described with reference to FIGS. 1 and 2 is the configuration of a liquid crystal panel 100 of a liquid crystal display according to a first preferred embodiment of the present invention.

FIG. 1 is a plan view showing the entire configuration of the liquid crystal panel 100. FIG. 2 is a sectional view taken along line A-A indicated in FIG. 1. Exemplified herein is a dual-screen liquid crystal panel of a thin film transistor (TFT) system.

As shown in FIG. 1, the liquid crystal panel 100 includes a TFT array substrate (hereinafter, referred to as an array substrate) 110, a color filter substrate (hereinafter, a CF substrate) 120, and a main seal pattern 130. The array substrate 110 is provided with TFTs that serve as switching elements and are located in an array form. The CF substrate 120 is provided with color filters and the like. The main seal pattern 130 seals a gap between the array substrate 110 and the CF substrate 120. In FIG. 1, the horizontal direction is referred to as an X direction and the vertical direction is referred to as a Y direction.

The main seal pattern 130 is located between the array substrate 110 and the CF substrate 120 so as to surround at least a display area 200 corresponding to a screen displaying images when the liquid crystal panel 100 is in operation.

As shown in FIG. 2, there are provided, between the array substrate 110 and the CF substrate 120 in the display area 200, a plurality of columnar spacers 133 forming and keeping the gap between these substrates within a predetermined range, in other words, keeping a distance between these substrates within a predetermined range. In FIG. 2, the horizontal direction is referred to as the X direction and the thickness direction is referred to as a Z direction.

A liquid crystal material is held at least in an area corresponding to the display area 200 in the gap sealed by the main seal pattern 130 between the array substrate 110 and the CF substrate 120 that are held by the columnar spacers 133, thereby forming a liquid crystal layer 140. In other words, the liquid crystal material is sealed in a space (cell) defined by the array substrate 110, the CF substrate 120, and the main seal pattern 130.

Used in this case is an ordinary liquid crystal material of a twisted nematic (TN) type. The expression "display area 200" is defined to indicate all areas on the array substrate 110, on the CF substrate 120, and between these substrates of the liquid crystal panel 100. This expression is always regarded herein as indicating similarly.

As shown in FIGS. 1 and 2, as the array substrate 110, a transparent glass substrate 111 made of ordinary glass of about 0.7 mm thick is provided, on a first one of main surfaces (the main surface facing the CF substrate 120), with pixel electrodes 113, TFTs 114, an insulating film 115, a plurality of gate wires 116, a plurality of source wires 117, a signal terminal 118, a transfer electrode (not shown), and the like. The pixel electrodes 113 apply voltage used for driving liquid crystal. The TFTs 114 serve as switching elements for supplying voltage to the pixel electrodes 113. The insulating film 115 covers the TFTs 114. The gate wires 116 and the source wires 117 supply signals to the TFTs 114. The signal terminal 118 receives from outside the signals supplied to the TFTs 114. The transfer electrode transmits the signals received by the signal terminal 118 to a counter electrode 123. The glass substrate 111 is provided with an alignment film 112 in the area corresponding to the display area 200 on the first main surface. The alignment film 112 aligns the liquid crystal. The glass substrate 111 is further provided with a polarizing plate 134 on a second one of the main surfaces.

As the CF substrate 120, a transparent glass substrate 121 made of extremely thin glass of about 0.1 mm thick is provided, on a first one of main surfaces (the main surface facing the array substrate 110), with color filters 124, black matrices (BMs) 125, a common electrode 123, and an alignment film 122. The BMs 125 serve as light blocking films blocking light in areas between the adjacent color filters 124 or blocking light in a frame area located outside the area corresponding to the display area 200. The common electrode 123 is located on the color filters 124 and the BMs 125, and generates an electric field between the pixel electrodes 113 on the array substrate 110 and itself to drive the liquid crystal. The alignment film 122 is located on the common electrode 123 and aligns the liquid crystal.

The color filters 124 can be provided as color material layers made of resin including pigment or the like dispersed therein. The color filters 124 serve as filters selectively transmitting light in a specific wavelength range such as red, green, blue, or the like, and include the color material layers in these different colors arrayed regularly.

The BMs 125 are located not only between the adjacent color filters 124 but also in the frame area outside the display area 200 so as to be provided substantially entirely in the frame area of the CF substrate 120 and block transmission of light into the CF substrate 120 in the frame area that is not used for displaying.

The glass substrate 121 is provided with a parallax barrier 126 on a second one of the main surfaces. The parallax barrier 126 serves as a light blocking film separating two lines of sight for the dual-screen LCD. A protective film 132 is provided on the parallax barrier 126, and a polarizing plate 135 is provided on the protective film 132.

The parallax barrier 126 includes transmissive portions 126T transmitting light and light blocking portions 126B each provided around corresponding one of the transmissive portions 126T to block light. The transmissive portions 126T are planarly displaced from the color filters 124 between the adjacent BMs 125 each located between pixels (between the color filters 124). A pair of color filters 124 are provided for one transmissive portion 126T so as to correspond to the two lines of sight. Each of the transmissive portions 126T can have a long slit shape in planar view, of width substantially equal to the width of the BMs 125 each located between the pixels. The plurality of transmissive portions 126T are arrayed in the area including the integrally formed light blocking portions 126B, and each of the transmissive portions 126T is located between the pair of color filters 124. The slit shape of the transmissive portions 126T can have length corresponding to each pixel or length corresponding to a plurality of pixels so that the transmissive portions 126T are arrayed continuously in one side of the display area 200. In any of these cases, there are arrayed the plurality of transmissive portions 126T.

The two lines of sight are determined in accordance with the planar (horizontal) positional relationship between the transmissive portions 126T and the color filters 124 each located between the adjacent BMs 125 in the parallax barrier 126 and the thickness (about 0.1 mm in the present preferred embodiment) of the glass substrate 121 corresponding to the vertical distance between the parallax barrier 126 and the BMs 125. If the horizontal positional relationship (resolution) and the like are constant, difference in angle between the two lines of sight is larger as the glass substrate 121 is thinner.

In order to realize appropriate difference of 20 to 40 degrees between the lines of sight within an ordinary pixel resolution range in an in-vehicle dual-screen LCD for displaying different images to a driver's seat and a passenger seat, the glass substrate 121 is made extremely thin so as to be about 0.05 to 0.1 mm thick.

Depending on required specifications in terms of lines of sight and resolution, the glass substrate 121 can have ordinary thickness of about 0.3 mm. In this manner, the thickness of the glass substrate 121 can be appropriately decided within the range from 0.05 to 0.5 mm.

The light blocking portions 126B in the parallax barrier 126 each have two layered films, namely, a lower light blocking film 1261 (close to the glass substrate 121) and an upper light blocking film 1262. On the other hand, the transmissive portions 126T are each made of a transparent resin film or the like.

The light blocking films serving as the BMs 125 can be made of a metal material to be provided as layered films of chromium and chromium oxide, a resin material (resin BMs) including black particles dispersed therein, or the like. The light blocking portions 126B in the parallax barrier 126 are desirably made of a resin material, because the light blocking portions 126B are formed by applying a light blocking resin material in a self-aligned manner after the transmissive portions 126T are formed, as to be described later.

There can be provided, below the alignment film, an overcoat layer of a transparent resin film so as to cover the color filters 124 and the BMs 125.

As described earlier, the array substrate 110 and the CF substrate 120 are bonded to each other with the main seal pattern 130 being interposed therebetween. The columnar spacers 133 located in the display area 200 keep the predetermined distance between these substrates.

The transfer electrode (not shown) and the common electrode 123 are electrically connected with each other by way of a transfer member, and signals received by the signal terminal 118 are transmitted to the common electrode 123. The transfer member can be replaced with conductive particles or the like mixed into the main seal pattern 130. Still alternatively, the transfer member may not be provided.

According to the present preferred embodiment, the main seal pattern 130 includes conductive particles or the like mixed thereinto. As shown in FIGS. 1 and 2, the main seal pattern 130 is in contact with the common electrode 123. The transfer electrode is thus located so as to be planarly overlapped with the main seal pattern 130 and be in contact with the main seal pattern 130. In this manner, the transfer electrode and the common electrode 123 are electrically connected with each other by way of the main seal pattern 130.

In addition to the components having been mentioned, the liquid crystal panel 100 further includes a control substrate 136 for generating drive signals, flexible flat cable (FFC) 137 electrically connecting the control substrate 136 to the signal terminal 118, a backlight unit serving as a light source (in general, located outside the array substrate 110 opposite to the CF substrate 120 providing the display screen so as to face the main surface of the array substrate 110; not shown herein), and the like. The liquid crystal panel 100 is accommodated, along with these components, in a casing (not shown) that is opened so as to expose the outer main surface of the CF substrate 120 providing the display screen in the display area 200, thereby forming the liquid crystal display according to the present preferred embodiment.

<Method of Producing Liquid Crystal Display>
<Overall Production Flow>

A method of producing the liquid crystal panel 100 of the liquid crystal display according to the present preferred embodiment is described next by following FIG. 3 and referring to FIGS. 1 and 2.

In general, one or a plurality of (multiple) liquid crystal panels are cut out of a mother substrate that is larger than the final shape of the liquid crystal panel.

Figure 3:
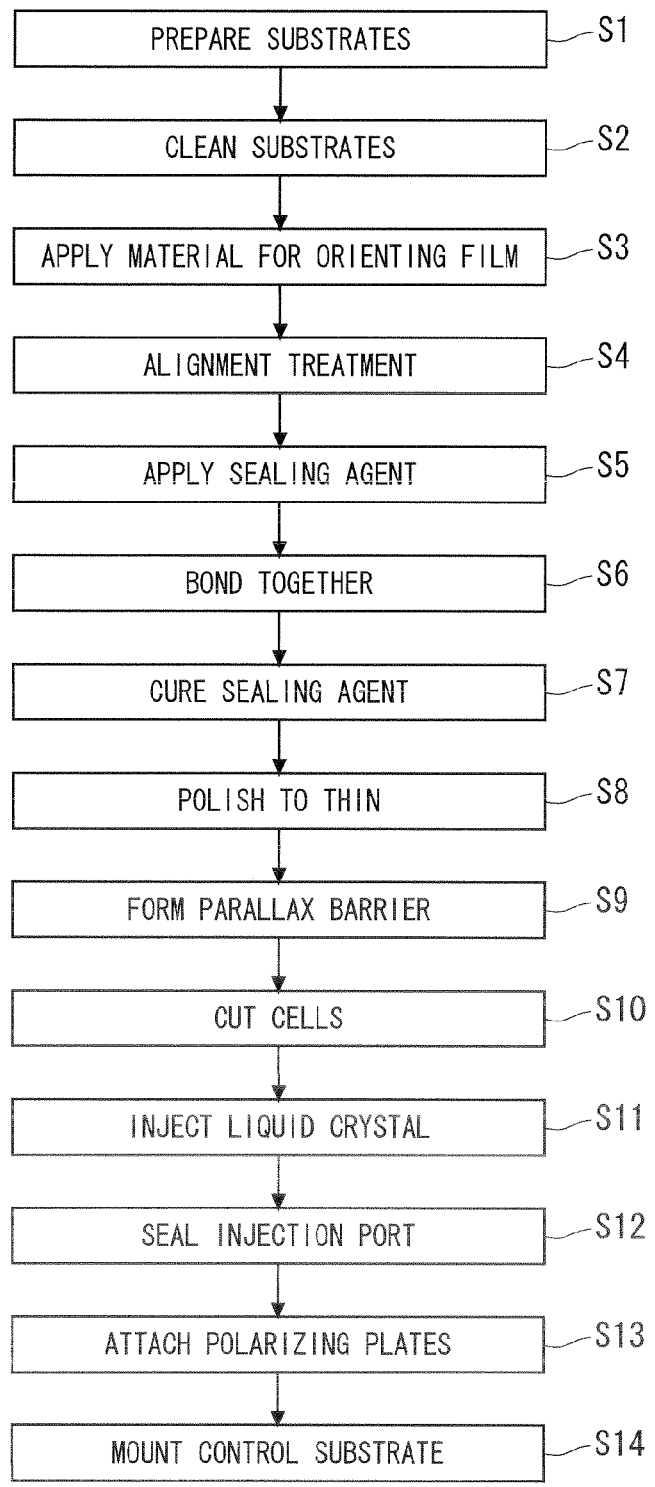
FIG. 3 is a flowchart showing the steps of assembling the liquid crystal panel of the liquid crystal display according to the present invention.

FIG. 3 is a flowchart showing the steps of assembling the liquid crystal panel 100. Initially in step S1, there are prepared substrates. More specifically, there are prepared a mother array substrate to cut out the array substrate 110 and a mother CF substrate to cut out the CF substrate 120 before being bonded together.

The final CF substrate 120 is made of extremely thin glass obtained by thinning glass. The mother array substrate and the mother CF substrate are made of glass of about 0.5 to 1.5 mm thick in the middle of the process, in order to facilitate the following steps. The mother array substrate and the mother CF substrate are prepared herein as glass substrates both made of glass of 0.7 mm thick.

In this step, preparation of the mother array substrate includes forming, on the substrate, the pixel electrodes 113, the TFTs 114, the insulating film 115, the gate wires 116, the source wires 117, the signal terminal 118, and the like shown in FIGS. 1 and 2. Such formation is made similarly to that in a method of producing an array substrate in an ordinary liquid crystal panel, and thus is not detailed herein.

In this step, preparation of the mother CF substrate includes forming, on the substrate, the color filters 124, the BMs 125, the common electrode 123, and the like shown in FIGS. 1 and 2. Such formation is made similarly to that in a method of producing a CF substrate in an ordinary liquid crystal panel provided with columnar spacers, and thus is not detailed herein.

Subsequently in step S2 of cleaning the substrates, the mother array substrate prepared in step S1 is cleaned.

Next in step S3 of applying a material for the alignment film, the material for the alignment film is applied onto one of the main surfaces of the mother array substrate. This step includes applying, by printing or the like, the material for the alignment film of an organic material and baking with use of a hot plate or the like to dry the applied material.

Subsequently in step S4 of alignment treatment, the material for the alignment film is rubbed to align the surface of the material for the alignment film so as to form the alignment film 112.

Such alignment treatment in step S4 is performed to define the aligned direction of the liquid crystal and is important in the formation of a liquid crystal panel.

The mother CF substrate is also provided with the alignment film 122 by performing the steps of cleaning the substrate, applying a material for the alignment film, and aligning, similarly to steps S2 to S4.

Next in step S5 of applying a sealing agent, a sealing agent is applied as printing paste onto one of the main surfaces of the mother array substrate or the mother CF substrate with use of a screen printer, so as to finally form the main seal pattern 130 in a shape surrounding the display area 200.

At this stage, the main seal pattern 130 is provided with an injection port as an opening used for injecting liquid crystal.

Subsequently in step S6 of bonding treatment, the mother array substrate and the mother CF substrate are bonded together to form a mother cell substrate. Thereafter, in step S7 of curing the sealing agent, the seal pattern 130 is cured completely.

After the seal pattern 130 is cured, in step S8 of thinning polish, the peripheries of the mother array substrate and the mother CF substrate are sealed to prevent a chemical from entering the gap between the substrates. A protective film is then attached only to the mother array substrate, and the entire mother cell substrate is immersed in an etchant of hydrofluoric acid series, such as a chemical mainly containing HF (hydrogen fluoride or hydrofluoric acid), to reduce the surface of the mother CF substrate so as to thin the substrate. Obtained as a result is the mother cell substrate, in which only the mother CF substrate is thinned to extremely thin glass of about 0.1 mm thick and the mother array substrate provided with the protective film is kept to 0.7 mm thick.

Next in step S9 of forming a parallax barrier, the thinned mother CF substrate is provided, on the main surface, with the parallax barrier 126 and the protective film 132. The parallax barrier 126 provides the function as a dual-screen liquid crystal panel. This step is to be described later.

Next in step S10 of cutting cells, the mother cell substrate thus provided with the parallax barrier 126 is cut along scribe lines so as to be divided into individual liquid crystal panels.

After cutting into panel outer shapes and cutting off the unnecessary portion of each of the CF substrates 120, in step S11 of injecting liquid crystal, each cell defined by the array substrate 110, the CF substrate 120, and the main seal pattern 130 is filled with liquid crystal.

More specifically, the cut liquid crystal panel is placed in a vacuum chamber and the space in the vacuum chamber is brought into a vacuum state with use of a vacuum pump so as to degas the cell. Thereafter, the liquid crystal is made in contact with the injection port (not shown) of the liquid crystal panel in the vacuum chamber and the space in the vacuum chamber is then returned to atmospheric pressure, so as to have the liquid crystal sucked into the cell of the liquid crystal panel.

Subsequently in step S12 of sealing the injection port, UV curable resin is applied to the injection port and then ultraviolet (UV) light is applied to cure the resin and seal the injection port.

Then in step S13 of attaching polarizing plates, the polarizing plates 134 and 135 are attached respectively to the outermost surfaces of the array substrate 110 and the CF substrate 120. In step S14 of mounting a control substrate, the FFC 137 is pressure bonded to the signal terminal 118 so as to mount the control substrate 136. The liquid crystal panel 100 thus provided with the control substrate 136 is assembled into the predetermined casing to complete the liquid crystal display.

<Parallax Barrier Formation Step>

The step of forming the parallax barrier 126 is described below with reference to FIGS. 4 to 8. Described below is a simplified configuration, in order for simpler description as well as for unlimited application of the configuration in addition to the liquid crystal panel 100 shown in FIGS. 1 and 2.

Figure 4:
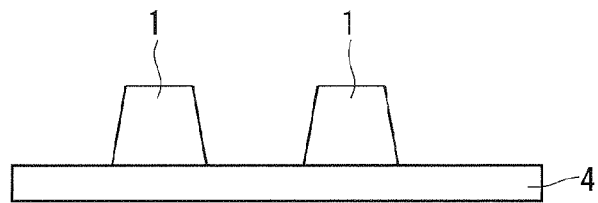
FIGS. 4 to 8 are sectional views illustrating the step of forming a parallax barrier in a liquid crystal display according to a first preferred embodiment of the present invention.

Initially in the step shown in FIG. 4, projecting transparent films 1 are formed in areas allowing light to pass therethrough (areas provided with the transmissive portions 126T in FIG. 2) in the parallax barrier on a transparent substrate 4 (corresponding to the glass substrate 121 in FIG. 2).

More specifically, transparent photosensitive resin or the like is applied to the transparent substrate 4 to form a film. This photosensitive resin film is patterned by photolithography to form patterns of the projecting transparent films 1. The photosensitive resin film can be made of acrylic resin or the like. The step shown in FIG. 4 corresponds to the step of forming and patterning a photosensitive resin film on the main surface of the thinned mother CF substrate in the production flow described with reference to FIG. 3.

As shown in FIG. 4, each of the transparent films 1 is tapered such that an upper surface is smaller than a lower surface (forward tapered). FIG. 4 shows the transparent substrate 4 cut to clearly show the sectional shape of the transparent films 1 in the width direction. If the transmissive portions 126T in the parallax barrier 126 each have a thin shape, each of the transparent films 1 is tapered such that the upper surface is smaller than the lower surface (forward tapered) also in the sectional shape in the longitudinal direction.

These projecting transparent films 1 serve as the transmissive portions in the parallax barrier, and the patterning is thus important. It is desired to perform the step of detecting defective patterns after the step of forming the transparent films 1. By performing the step of detecting defective patterns, the subsequent steps are performed only to the transparent substrates 4 that are correctly provided with the transparent films 1 with no defective patterns. It is thus possible to inhibit production of liquid crystal displays of low display quality due to defective patterns.

This step of detecting defective patterns can be performed in an ordinary manner by comparison of patterns. More specifically, repetitive patterns formed on the substrate are optically imaged and images of adjacent repetitive patterns are processed by binarization or the like to simplify the patterns. These adjacent patterns thus simplified are compared with each other to detect a pattern different from the adjacent pattern as a defective pattern (faulty pattern).

Only immediately after processing the photosensitive resin films by photolithography, it is possible to perform rework treatment in which the transparent films 1 in defective patterns are removed with use of an alkaline resist remover to repeat the step of forming the transparent films 1. It is thus possible to suppress deterioration in production yield as a whole.

In a case of a defectively left pattern where the transparent film 1 is left outside the areas to be provided with the transparent films 1, the light blocking portion to be formed later is not provided in such a portion, which is kept transmissive. In such a case, it is desired to perform the rework treatment.

In another case of a defectively lacking pattern where the transparent film 1 is not formed entirely in the area to be provided therewith, it may be possible to skip the rework treatment if the lacking area is relatively small in the opening because such a small lacking area may not be visually recognized as being defective.

Figure 5:
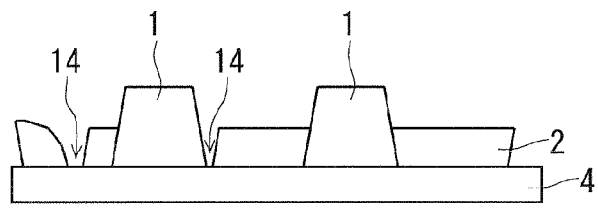

Next in the step shown in FIG. 5, light blocking films 2 (corresponding to the light blocking films 1261 in FIG. 2) are formed on the transparent substrate 4 that is provided with the patterned transparent films 1. The light blocking films 2 are made thinner than the transparent films 1.

Application conditions for forming the light blocking films 2 are preferably adjusted so as not to form the light blocking film 2 on the transparent film 1 as much as possible, or so as to thin as much as possible the light blocking film 2 formed on the transparent film 1. It may be possible to skip or shorten the following step of removing the light blocking films.

If a light blocking resin material is applied onto the rotating transparent substrate 4, the light blocking films 2 can be formed in recesses between the adjacent transparent films 1 in a self-aligned manner. The conditions mentioned above can be satisfied by adjusting the amount of the resin material to be applied.

It is also possible to remove the light blocking films formed on the transparent films 1 by adding later dry etching treatment, chemical mechanical polishing (CMP) treatment, or the like to flatten the surface. The light blocking films 2 can be thus formed so as to cover the transparent films 1.

As shown in FIG. 5, the light blocking films 2 may have lacking portions 14 such as pinholes or defective patterns.

Figure 6:
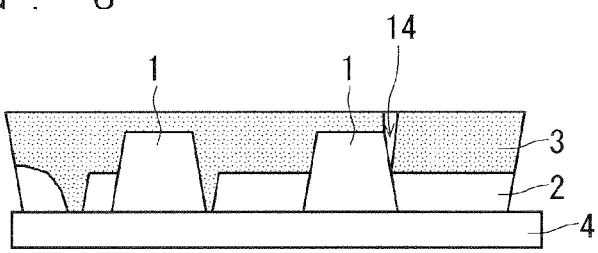

Next in the step shown in FIG. 6, light blocking films 3 (corresponding to the light blocking films 1262 in FIG. 2) are formed on the transparent substrate 4 that is provided with the transparent films 1 and the light blocking films 2 so as to cover the light blocking films 2 and the transparent films 1 (so as to be higher than the upper surfaces of the transparent films 1). The light blocking films 3 can be formed by applying light blocking resin or the like onto the rotating transparent substrate 4.

The light blocking films 2 and 3 can be made of a resin material (resin BMs) that includes resin used for forming ordinary black matrices and black pigment (such as carbon black or black titanium oxide) dispersed in the resin. The light blocking films 2 and 3 can be made of a same material or different materials.

By applying the material onto the rotating transparent substrate, the formed light blocking films 3 have flattened surfaces as shown in FIG. 6. The light blocking films 3 are thus made relatively thin on the transparent films 1. In the later step shown in FIG. 7, the light blocking films 3 are isotropically polished, etched, or the like, so that the upper surfaces of the transparent films 1 can be exposed while the light blocking films 3 are left. The transparent films 1 can be thus provided as the transmissive portions in the parallax barrier, and the light blocking films 2 and 3 can be layered in a self-aligned manner between the adjacent transparent films 1 as the light blocking portions, thereby completing the parallax barrier.

Even when the light blocking film 2 is formed on the transparent film 1, such a light blocking film 2 can be removed in the step of polishing or etching the light blocking films 3.

Figure 7:
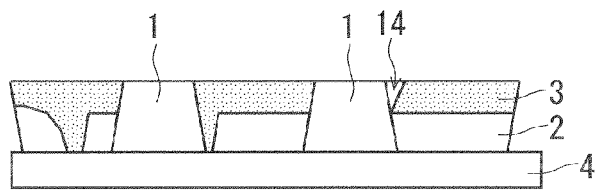

The lacking portions 14 in the light blocking films 2, such as pinholes or defective patterns shown in FIGS. 6 and 7, are filled with the light blocking films 3 layered thereon so as not to defectively transmit light.

As shown in FIG. 7, lacking portions 14 such as pinholes or defective patterns may be possibly formed also during formation of the light blocking films 3. Such lacking portions 14 in the light blocking films 3 are very unlikely to be formed on the lacking portions 14 such as pinholes or defective patterns in the light blocking films 2. The light blocking films 2 are mostly formed under the lacking portions 14 in the light blocking films 3, so that the lacking portions 14 do not defectively transmit light.

In this manner, the lacking portions 14 in both of the light blocking films 2 and 3 are not actually defective, thereby exerting the effect of redundancy by the double-layered light blocking films.

Figure 8:
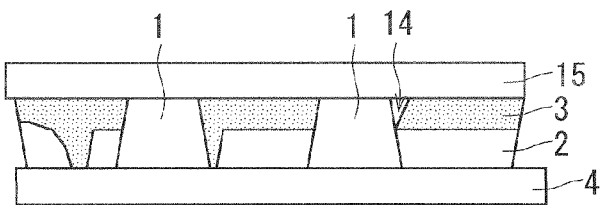

Lastly in the step shown in FIG. 8, a transparent protective film 15 is formed on the transparent films 1 and the light blocking films 3 having the exposed upper surfaces.

The protective film 15 can be a transparent resin film made of acrylic resin, polyimide resin, epoxy resin, or the like, or can be an inorganic insulating film (such as a silicon oxide film or a silicon nitride film). The protective film 15 according to the present preferred embodiment is formed by applying transparent resin onto the rotating transparent substrate 4 in order to achieve a surface coverage effect and a crack preventive effect.

The step shown in FIG. 8 corresponds to the step of forming the protective film 132 on the parallax barrier 126 on the thinned mother CF substrate in the mother cell substrate obtained by bonding the mother array substrate with the mother CF substrate in the production flow described with reference to FIG. 3. The mother cell substrate is thus completed.

Alternatively, before bonding the CF substrate with the mother array substrate, the parallax barrier 126 and the protective film 132 can be formed, as in the steps shown in FIGS. 4 to 8, on the mother CF substrate, which is then bonded with the mother array substrate so as to complete the mother cell substrate.

<Effects>

As having been described, the protective film 15 is provided to cover the parallax barrier including the transparent films 1 and the layered light blocking films 2 and 3. It is thus possible to prevent cracks in the light blocking films 2 and 3 in the steps after the formation of the parallax barrier, in other words, in step S10 and the later steps shown in FIG. 3.

This effect can be significantly achieved by the protective film 15 made of a material stronger than those for the light blocking films 2 and 3. If adhesive force between the light blocking films 3 and the protective film 15 is made stronger than adhesive force between the light blocking films 2 and the light blocking films 3, even upon application of external force strong enough to peel off the protective film 15, the light blocking films 3 firmly attached with the protective film 15 are peeled off together with the protective film 15, while the light blocking films 2 relatively weakly attached with the light blocking films 3 are less likely to be peeled off. The light blocking films 2 are thus left to prevent light transmission due to cracks or the like. As a result, it is possible to prevent production of a liquid crystal display of low display quality.

After the formation of the light blocking films 3, the light blocking films 3 are isotropically polished or etched so as to expose the upper surfaces of the transparent films 1 while the light blocking films 3 are left. The transparent films 1 are thus provided as the transmissive portions in the parallax barrier.

The light blocking portions of the layered light blocking films 2 and 3 are provided between the adjacent transparent films 1 in a self-aligned manner. It is thus possible to provide the parallax barrier that is flattened and less uneven. In a case of attaching the polarizing plate (corresponding to the polarizing plate 135 in FIG. 2) directly onto the parallax barrier, bubbles and unevenness and the like are less likely to be formed between the parallax barrier and the polarizing plate.

Figure 9:
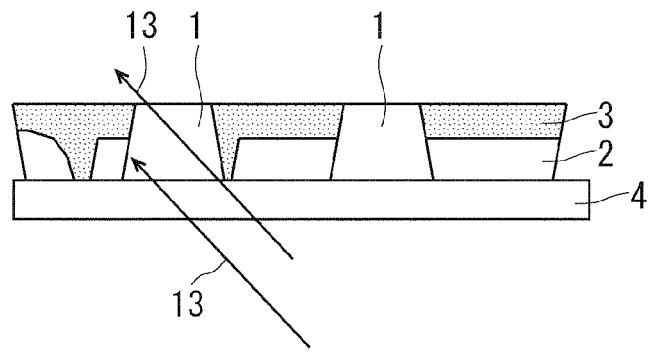
FIG. 9 is a view illustrating an effect obtained by transparent films each having a tapered shape.

In the case where the projecting transparent films 1 formed on the transparent substrate 4 are tapered such that the upper surfaces are smaller than the lower surfaces (forward tapered) as shown in FIG. 4, the transparent films 1 serving as the transmissive portions in the parallax barrier each have a light exit area smaller than a light incident area. In this case, as shown in FIG. 9, the light blocking films 2 and 3 are reversely tapered. As shown in FIG. 9, part of light 13 incident obliquely from below the transparent substrate 4 is blocked by the light blocking films 2 and 3 being reversely tapered so as to prevent deterioration in contrast in a predetermined direction to improve the optical characteristics.

The projecting transparent films 1 being forward tapered improve coverage of the light blocking films to be coated, thereby preventing defective coverage (such as formation of a gap).

The forward tapered transparent films 1 can be formed relatively easily by employing transparent photosensitive resin of moderate resolution as an ordinary LCD material and setting baking temperature in an ordinary range of about 150 to 240° C.

First Modification Example

In the first preferred embodiment according to the present invention, the protective film 15 covers the parallax barrier including the transparent films 1 and the layered light blocking films 2 and 3. Alternatively, the protective film 15 (the protective film 132 in FIG. 2) may not be provided.

More specifically, the double-layered light blocking films 2 and 3 by themselves prevent, to some extent, deterioration in display quality against cracks or peeling off due to external contact or the like.

For example, even when the upper light blocking film 3 slightly has a crack or peeling off due to external force applied only to the surface layer, the lower light blocking film 2 is left to prevent light transmission due to the crack or the like, thereby preventing deterioration in display quality and the defect.

When the upper light blocking films 3 are made of a material strong enough to prevent cracks, more specifically, a material stronger than that for the light blocking films 2, cracks generated by external force are less likely to reach the light blocking films 2.

If adhesive force between the light blocking films 2 and the light blocking films 3 is made weaker than adhesive force between the transparent substrate 4 and the light blocking films 2, even upon application of external force strong enough to peel off the light blocking films 3, the light blocking films 2 relatively weakly attached with the light blocking films 3 are less likely to be peeled off. The light blocking films 2 are thus left to prevent light transmission due to cracks or the like.

As a result, it is possible to prevent production of a liquid crystal display of low display quality.

As described above, the effects similar to those of the first preferred embodiment can be achieved even if the protective film 15 is not provided, as long as at least the two light blocking films are layered. There is another advantage of the lowest production cost in the case where the light blocking portions in the parallax barrier are formed by the double-layered light blocking films.

It is needless to note that the above effects can be achieved also in a case where the parallax barrier includes three or more layered light blocking films.

Second Modification Example

In the first preferred embodiment according to the present invention, the transparent films 1 are patterned on the transparent substrate 4 and then the light blocking films 2 and 3 are layered sequentially, so as to form the light blocking portions in the parallax barrier in a self-aligned manner. Alternatively, this configuration can be formed in the following method.

More specifically, after the light blocking films 2 and 3 are layered sequentially on the transparent substrate 4, the light blocking films 2 and 3 can be patterned by photolithography to open the areas corresponding to the transmissive portions in the parallax barrier, so that the openings thus formed serve as the transmissive portions.

Also in such a configuration, the protective film 15 provided on the light blocking films 2 and 3 achieves the effects similar to those of the first preferred embodiment. Even in the case where the protective film 15 is not provided, it is possible to achieve the effects similar to those of the first modification example.

<Formation of Openings by Double Patterning>

In the case of forming the configuration according to the second modification example, the light blocking films 2 and 3 can be simultaneously opened in the areas corresponding to the transmissive portions in the parallax barrier with use of a single photomask. Alternatively, the light blocking films 2 and 3 can be separately opened with use of different photomasks.

More specifically, after the light blocking films 2 are formed on the transparent substrate 4, the first patterning step is performed to form, by photolithography, first openings in the light blocking films 2 in the areas corresponding to the transmissive portions in the parallax barrier. Thereafter, the light blocking films 3 are formed on the light blocking films 2, and then the second patterning step is performed to form, by photolithography, second openings in the light blocking films 3 in the areas corresponding to the transmissive portions in the parallax barrier. In this case, each of the first openings and each of the second openings are formed approximately at same positions so as to configure one opening penetrating the light blocking films 2 and 3.

In this method, even if exposure is inappropriate or a resist used for patterning is cracked in each of the first and second patterning steps of opening the light blocking films 2 and 3, the defective portions formed in the light blocking films 2 and 3 in the first and second patterning steps are hardly located at same positions. In this manner, redundancy by the double-layered light blocking films is also effective against defective patterning.

<Setting of Opening Areas>

In the case where the light blocking films 2 and 3 are separately opened with use of different photomasks as mentioned above, the second openings are formed in the light blocking films 3 in the second patterning step at substantially same positions of the first openings formed in the light blocking films 2 in the first patterning step. The first openings and the second openings can have same or different areas.

Figure 10:
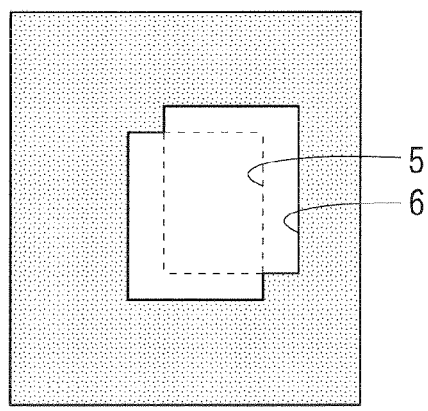
FIGS. 10 and 11 are plan views showing shapes of openings formed separately in layered light blocking films.
Figure 11:
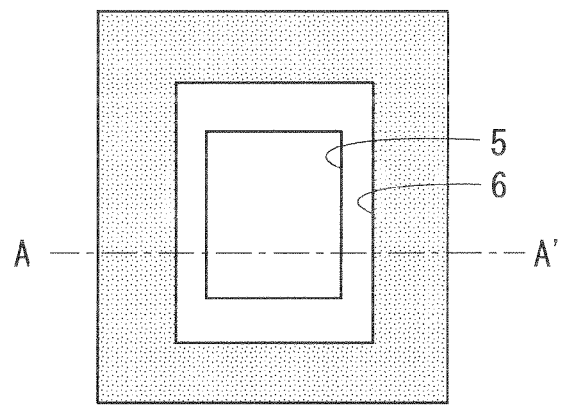

More specifically, as shown in FIG. 10, an opening 5 in the light blocking film 2 and an opening 6 in the light blocking film 3 can have same areas. Alternatively, as shown in FIG. 11, the opening 6 formed secondly in the light blocking film 3 can have an area larger than that of the opening 5 formed firstly in the light blocking film 2. In any of these cases, redundancy by the double-layered light blocking films is also effective against defective patterning. There are additionally exerted the following effects.

<Additional Effects by Same Opening Areas>

In the case where the opening 5 in the light blocking film 2 and the opening 6 in the light blocking film 3 have same opening areas, if the photomasks are located at different positions upon formation of the opening 5 and upon formation of the opening 6, the openings 5 and 6 thus formed are displaced from each other as shown in FIG. 10. In such a case, the effective opening area corresponds to the overlapped portions between the opening 5 and the opening 6.

In such a case where the light blocking films 2 and 3 are provided respectively with the openings 5 and 6 of same areas separately with use of the different photomasks, variation in production results in the different areas of the transmissive portions in the parallax barrier. The positions of the photomasks are unlikely to be largely displaced from each other now that the alignment technique has been developed significantly. More specifically, alignment accuracy of the photomasks used for formation of the transmissive portions in the parallax barrier can be lower than alignment accuracy of photomasks used for recent production of a semiconductor memory or the like, without causing a problem of misalignment.

In the case where the opening 5 in the light blocking film 2 and the opening 6 in the light blocking film 3 have same opening areas, the common photomask can be used for both of formation of the opening 5 in the light blocking film 2 and formation of the opening 6 in the light blocking film 3. This leads to simplification of the production steps and reduction in production cost, which is rather important.

<Additional Effects by Different Opening Areas>

In the other case where the opening 5 in the light blocking film 2 and the opening 6 in the light blocking film 3 have different opening areas, the smaller area of the opening 5 in the light blocking film 2 is set as the area to form the transmissive portion in the parallax barrier and the larger area of the opening 6 in the light blocking film 3 is set in consideration of variation in production (such as difference in opening width or misalignment). Even with variation in production, the end edge of the opening 6 is layered on the opening 5 so as to avoid substantial decrease in area of the opening 5.

Figure 12:
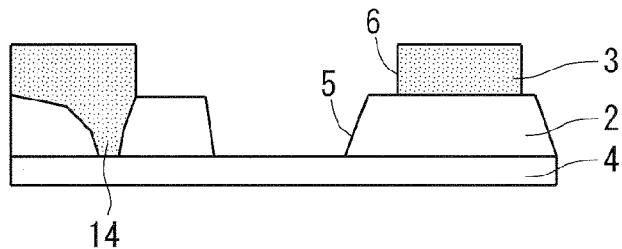
FIGS. 12 and 13 are sectional views showing the shapes of the openings formed separately in the layered light blocking films.
Figure 13:
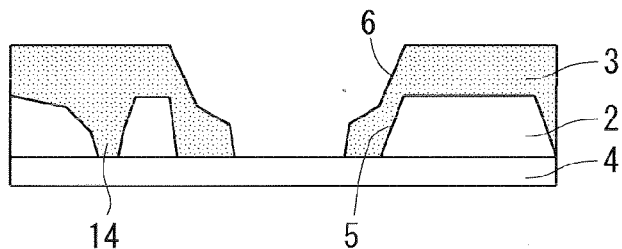

FIGS. 12 and 13 are sectional views taken along line A-A indicated in FIG. 11, showing the state where the opening 5 in the light blocking film 2 and the opening 6 in the light blocking film 3 are formed. FIGS. 12 and 13 also exemplify the case where the light blocking film 2 has the lacking portion 14.

As shown in FIG. 12, the light blocking film 3 is formed on the light blocking film 2 that is already provided with the opening 5. At the same time, the lacking portion 14 in the light blocking film 2 is filled with the light blocking film 3, thereby effectively exerting redundancy by the double-layered light blocking films against defective patterning.

As shown in FIG. 13, the opening 5 in the light blocking film 2 can be formed larger than the area to form the transmissive portion in the parallax barrier and the opening 6 can be formed in the light blocking film 3 so as to have a crater shape in cross section, so as to be approximate to the area to form the transmissive portion in the parallax barrier. Also in this case, the lacking portion 14 in the light blocking film 2 is filled with the light blocking film 3, thereby effectively exerting redundancy by the double-layered light blocking films against defective patterning.

In this second modification example, the lacking portion 14 formed in the light blocking film 2 is filled with the light blocking film 3 so as to prevent light transmission and thus prevent production of a liquid crystal display of low display quality. Furthermore, the lacking portion 14 formed in the light blocking film 3 does not transmit light due to the lower light blocking film 2, thereby preventing production of a liquid crystal display of low display quality.

As a result, it is possible to keep a high yield with no need for repairing the light blocking film and the like. It is thus possible to produce, at low cost, a liquid crystal display including a parallax barrier.

Figure 14:
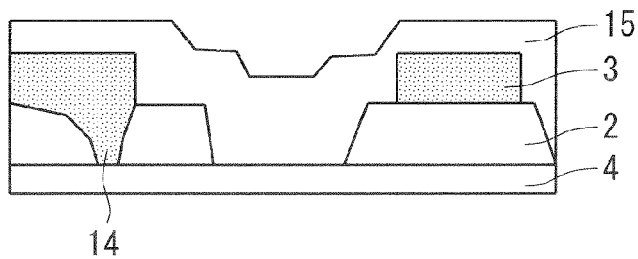
FIGS. 14 and 15 are sectional views each showing a state provided with a protective film when the openings are formed separately in the layered light blocking films.
Figure 15:
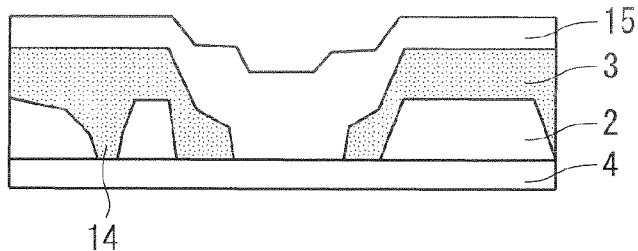

FIG. 14 exemplifies a case where the protective film 15 is formed on the light blocking films 2 and 3 in the configuration shown in FIG. 12. FIG. 15 exemplifies a case where the protective film 15 is formed on the light blocking films 2 and 3 in the configuration shown in FIG. 13.

The protective film 15 formed on the light blocking films 2 and 3 effectively prevents cracks in the light blocking films 2 and 3 in the steps after the formation of the parallax barrier, similarly to the first preferred embodiment.

Second Preferred Embodiment

As described above with reference to FIG. 6, the first preferred embodiment exemplifies the case where the light blocking films 3 are formed to be higher than the upper surfaces of the transparent films 1. Alternatively, the thickness of the light blocking films 3 can be set so as not to exceed the upper surfaces of the transparent films 1.

Figure 16:
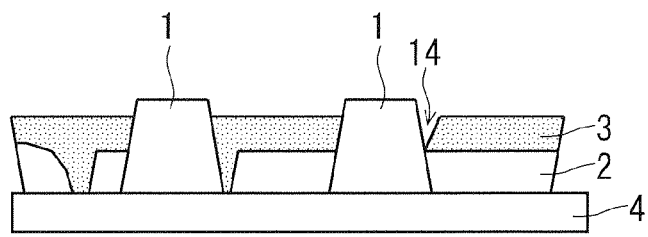
FIG. 16 is a sectional view illustrating the step of forming a parallax barrier in a liquid crystal display according to a second preferred embodiment of the present invention.

FIG. 16 exemplifies the case where the light blocking films 3 are formed on the transparent substrate 4 that is provided with the transparent films 1 and the light blocking films 2 so as to cover the light blocking films 2 (so as not to be higher than the upper surfaces of the transparent films 1). As a result, the transparent films 1 are thicker than the total thickness of the light blocking films 2 and 3.

As described earlier with reference to FIG. 7, the transparent films 1 can be isotropically polished, etched, or the like, so that the upper surfaces of the light blocking films 3 and those of the transparent films 1 are included in an identical plane.

Such flattened surfaces achieve the parallax barrier that is flattened and less uneven. Bubbles and unevenness are less likely to be formed between the parallax barrier and the polarizing plate (corresponding to the polarizing plate 135 in FIG. 2) provided on the parallax barrier.

Such thinner light blocking films 3 result in the reduced amount of the material for the light blocking films and further reduction in cost.

Third Preferred Embodiment

In the first and second preferred embodiments, the transparent films 1 are made of acrylic resin or the like. Such acrylic resin has the refractive index of 1.49, which is slightly higher than the refractive index of the transparent substrate 4 made of glass.

To the contrary, in a liquid crystal display according to the third preferred embodiment, a material for the transparent films 1 is selected so as to have a refractive index equal to or lower than the refractive index of the transparent substrate 4.

Figure 17:
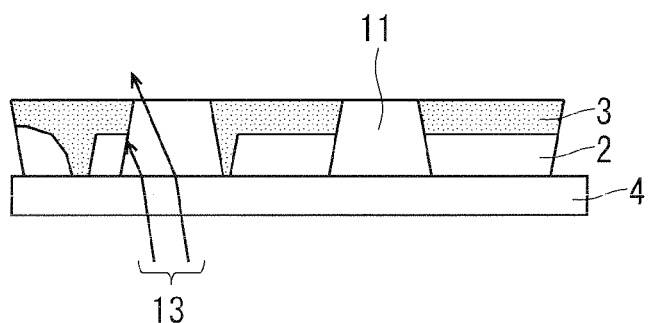
FIG. 17 is a sectional view illustrating the step of forming a parallax barrier in a liquid crystal display according to a third preferred embodiment of the present invention.

As shown in FIG. 17, light 13 incident obliquely from below the transparent substrate 4 has a larger refraction angle in an outward direction due to the difference in refractive index between the transparent substrate 4 and the transparent films 1, so as to prevent deterioration in contrast in a predetermined direction to improve the optical characteristics.

Examples of the material having a refractive index lower than that of the transparent substrate 4 include PTFE (having the refractive index of 1.35), FEP (having the refractive index of 1.34), and tetrafluoroethylene (having the refractive index of 1.35) of fluororesin.

Fourth Preferred Embodiment

In the first to third preferred embodiments, the transparent substrate 4 is provided thereon with the transparent films 1 made of acrylic resin or fluororesin. Alternatively, the transparent substrate 4 can be etched so as to project in the areas corresponding to the light blocking portions in the parallax barrier. A method of producing such a transparent substrate is described below with reference to FIGS. 18 to 21.

Figure 18:
FIGS. 18 to 21 are sectional views illustrating the step of forming a parallax barrier in a liquid crystal display according to a fourth preferred embodiment of the present invention.

Initially in the step shown in FIG. 18, there is prepared the transparent substrate 4. This transparent substrate 4 corresponds to the mother CF substrate having been processed in step 8 of thinning polish in FIG. 3. In this polishing step, the mother CF substrate is thinned so as to additionally have the thickness corresponding to the thickness of the transmissive portions in the parallax barrier.

Figure 19:
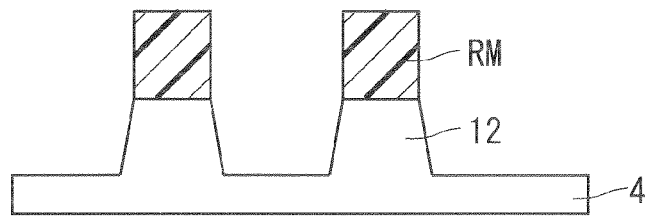

Next in the step shown in FIG. 19, a resist mask RM is formed so that the upper portions of the transparent substrate 4 in the areas corresponding to the transmissive portions in the parallax barrier are covered with a resist material. The transparent substrate 4 is wet etched with use of the resist mask RM as an etching mask so as to selectively form projections 12.

If the transparent substrate 4 is made of glass, etching conditions in this case include use of an etchant of hydrofluoric acid series (such as buffered hydrofluoric acid or dilute hydrofluoric acid) as an ordinary etchant used for polishing glass. Etching time and the like are further set in accordance with an etching rate of the glass by the etchant used and the height of the projections 12 to be formed (about 2 to 3 µm corresponding to the thickness of the parallax barrier).

Upon performing etching in this method, the portion closer to the upper main surface of the transparent substrate 4 is subject to etching for a longer period of time. As a result, the projections 12 are tapered such that the upper surfaces are smaller than the lower surfaces (forward tapered).

Figure 20:
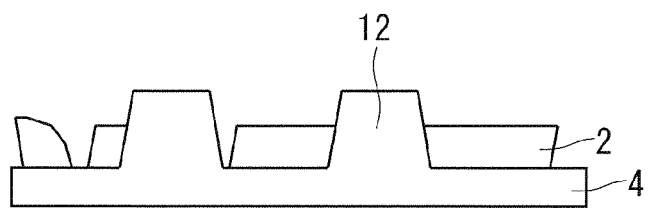

After the resist mask RM is removed, in the step shown in FIG. 20, the light blocking films 2 (corresponding to the light blocking films 1261 in FIG. 2) are formed on the transparent substrate 4 that is provided with the patterned projections 12. The light blocking films 2 are made thinner than the projections 12. The material for the light blocking films 2 and the formation method thereof are the same as those according to the first and second preferred embodiments.

Figure 21:
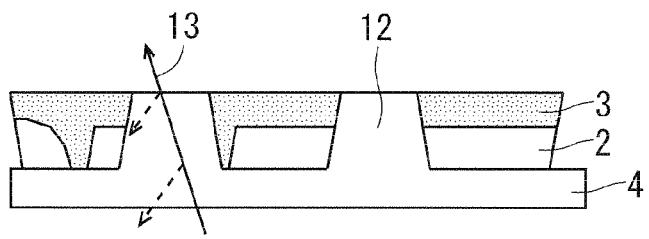

Next in the step shown in FIG. 21, the light blocking films 3 (corresponding to the light blocking films 1262 in FIG. 2) are formed on the transparent substrate 4 that is provided with the projections 12 and the light blocking films 2 so as to cover the light blocking films 2 and the projections 12 (so as to be higher than the upper surfaces of the projections 12). The material for the light blocking films 3 and the formation method thereof are the same as those according to the first and second preferred embodiments. Thereafter, the light blocking films 3 are isotropically polished, etched, or the like, so that the upper surfaces of the projections 12 are exposed while the light blocking films 3 are left. The projections 12 can be thus provided as the transmissive portions in the parallax barrier, and the light blocking films 2 and 3 can be layered in a self-aligned manner as the light blocking portions between the adjacent projections 12, thereby completing the parallax barrier.

The projections 12 can be formed in a method other than that described above, such as mechanical polishing or dry etching. For example, by performing etching with use of an etching gaseous species mixed with a gaseous species used for reducing a resist such as oxygen, etching proceeds in the depth direction of the transparent substrate 4 while the resist mask is being reduced, so as to obtain the forward tapered projections 12.

The projections 12 thus formed are provided integrally with the transparent substrate 4. In this case, there is no boundary between the transparent substrate 4 and each of the projections 12. As shown in FIG. 21, light 13 is not reflected at a boundary and utilization efficiency of the light 13 is thus improved.

Due to the forward tapered shapes, the projections 12 exert the effects same as those of the transparent films 1. Furthermore, due to the refractive index same as that of the transparent substrate 4, the projections 12 prevent deterioration in contrast in a predetermined direction to improve the optical characteristics.

The preferred embodiments of the present inventions can be freely combined together and can be appropriately modified or simplified within the scope of the invention.

While the invention has been shown and described in detail, the foregoing description is in all aspects illustrative and not restrictive. It is therefore understood that numerous modifications and variations can be devised without departing from the scope of the invention.

What is claimed is:
1. A liquid crystal display comprising:
    first and second transparent substrates made of glass located such that inner main surfaces face each other with a gap being provided therebetween and a liquid crystal layer is held between the substrates;
    a parallax barrier provided on an outer main surface of said first transparent substrate and optically separating pixels displaying an image into pixels visually recognized in a specific direction and pixels visually recognized in another specific direction; and
    a plurality of switching elements, arrayed on an inner main surface of said second transparent substrate, for applying voltage to drive the liquid crystal; wherein
    said parallax barrier includes a plurality of transmissive portions arrayed to transmit light and a plurality of light blocking portions provided respectively around said transmissive portions to block light,
    each of said light blocking portions includes two or more layered light blocking films,
    said transmissive portions are provided as projections and include a transparent film provided so as to project from said outer main surface of said first transparent substrate, and
    each of said projections is linearly tapered in cross section from said transparent substrate such that an upper surface is smaller than a lower surface so as to form a trapezoid.
2. The liquid crystal display according to claim 1, wherein said transparent film is made of a material having a refractive index equal to or lower than a refractive index of said first transparent substrate.

3. The liquid crystal display according to claim 1, wherein each of said light blocking portions includes a first light blocking film and a second light blocking film layered such that the second light blocking film is provided on the first light blocking film.

4. The liquid crystal display according to claim 1, further comprising a transparent protective film provided on said parallax barrier.

5. The liquid crystal display according to claim 1, wherein
said transmissive portions and said light blocking portions have upper surfaces flattened so as to be included in an identical plane, and
said parallax barrier thus flattened is provided thereon with a polarizing plate.

6. A method of producing the liquid crystal display according to claim 1, the method comprising the steps of:
(a) forming projecting transparent films in areas corresponding to said transmissive portions in said parallax barrier on said outer main surface of said first transparent substrate; and
(b) forming two or more layered light blocking films on said outer main surface of said first transparent substrate provided with said transparent films so as to obtain said light blocking portions in said parallax barrier; wherein
said step (a) includes patterning said transparent films so that each of said transparent films is tapered in cross section from said first transparent substrate with an upper surface being smaller than a lower surface.

7. The method of producing the liquid crystal display according to claim 6, wherein
said step (b) includes forming said layered light blocking films so that said layered light blocking films are thinner than said transparent films.

8. The method of producing the liquid crystal display according to claim 6, further comprising, after said step (b), the step of
(c) flattening said outer main surface of said first transparent substrate provided with said layered light blocking films so as to expose the upper surfaces of said transparent films.

9. The liquid crystal display according to claim 1, wherein said transparent film is linearly tapered in cross-section.

10. A liquid crystal display comprising:
first and second transparent substrates made of glass located such that inner main surfaces face each other with a gap being provided therebetween and a liquid crystal layer is held between the substrates;
a parallax barrier provided on an outer main surface of said first transparent substrate and optically separating pixels displaying an image into pixels visually recognized in a specific direction and pixels visually recognized in another specific direction; and
a plurality of switching elements, arrayed on an inner main surface of said second transparent substrate, for applying voltage to drive the liquid crystal; wherein
said parallax barrier includes a plurality of transmissive portions arrayed to transmit light and a plurality of light blocking portions provided respectively around said transmissive portions to block light,
each of said light blocking portions includes two or more layered light blocking films,
said transmissive portions are provided as projections from said outer main surface of said first transparent substrate so as to be integral with said first transparent substrate, and
each of said projections is linearly tapered in cross section from said transparent substrate such that an upper surface is smaller than a lower surface so as to form a trapezoid.

11. A method of producing the liquid crystal display according to claim 10, the method comprising the steps of:
(a) forming projections integrally with said first transparent substrate in areas corresponding to said transmissive portions in said parallax barrier on said outer main surface of said first transparent substrate; and
(b) forming two or more layered light blocking films on said outer main surface of said first transparent substrate provided with said projections so as to obtain said light blocking portions in said parallax barrier; wherein
said step (a) includes patterning said first transparent substrate so that each of said projections is tapered in cross section from said first transparent substrate with an upper surface being smaller than a lower surface.

12. The method of producing the liquid crystal display according to claim 11, wherein
said step (b) includes forming said layered light blocking films so that said layered light blocking films are thinner than said projections.

13. The method of producing the liquid crystal display according to claim 11, further comprising, after said step (b), the step of
(c) flattening said outer main surface of said first transparent substrate provided with said layered light blocking films so as to expose the upper surfaces of said projections.

* * * * *